(12) United States Patent
Zasowski et al.

(10) Patent No.: US 10,372,106 B2
(45) Date of Patent: Aug. 6, 2019

(54) METHODS AND APPARATUS FOR INCREASING THE RANGE OF DIGITAL INPUTS AND OUTPUTS ON A DOOR OPERATOR OR CLOSER

(71) Applicant: Yale Security, Inc., Monroe, NC (US)

(72) Inventors: Peter Zasowski, Yantis, TX (US); Dustin Lawhon, Lilesville, NC (US)

(73) Assignee: ASSA ABLOY Accessories and Door Controls Group, Inc., New Haven, CT (US)

( * ) Notice: Subject to any disclaimer, the term of this patent is extended or adjusted under 35 U.S.C. 154(b) by 398 days.

(21) Appl. No.: 14/902,245

(22) PCT Filed: Sep. 9, 2014

(86) PCT No.: PCT/US2014/054732
§ 371 (c)(1),
(2) Date: Dec. 30, 2015

(87) PCT Pub. No.: WO2015/035366
PCT Pub. Date: Mar. 12, 2015

(65) Prior Publication Data
US 2016/0370789 A1 Dec. 22, 2016

Related U.S. Application Data

(60) Provisional application No. 61/875,286, filed on Sep. 9, 2013.

(51) Int. Cl.
*E05F 15/70* (2015.01)
*E05F 15/72* (2015.01)
(Continued)

(52) U.S. Cl.
CPC ............ *G05B 19/409* (2013.01); *E05F 15/70* (2015.01); *G05B 19/042* (2013.01); *E05F 15/72* (2015.01);
(Continued)

(58) Field of Classification Search
None
See application file for complete search history.

(56) References Cited

U.S. PATENT DOCUMENTS 4,808,995 A 2/1989 Clark et al.
5,453,736 A 9/1995 Noren
(Continued)

FOREIGN PATENT DOCUMENTS

DE 202006009694 U1 9/2006

OTHER PUBLICATIONS

STM32F101. "Medium-density access line, ARM-based 32-bit MCU with 64 or 128 KB Flash, 6 timers, ADC and 7 communication interfaces" Datasheet-production data, Aug. 2013 (Aug. 2013) [retrieved on Oct. 29, 2014 (Oct. 29, 2014)] [retrieved on line from URL: http://www.st.com/web/en/resource/technical/document/datasheet/CD00161561.pdf], entire document, especially para 2.3.22 p. 19, FIG. 4, p. 22.

*Primary Examiner* — J. H. Hur
(74) *Attorney, Agent, or Firm* — Myers Bigel, P.A.

(57) ABSTRACT

A door operator includes a door driver for opening and closing a door, and a control system including a microprocessor having multiple microprocessor inputs. The microprocessor is connected to and controls the door driver. The microprocessor has multiple program modules corresponding to input functions to be performed by the door operator. The door operator includes a plurality of door operator inputs connected to corresponding ones of the microprocessor inputs, and a user interface connected to the micropro-
(Continued)

cessor. The user interface allows a user to associate a selected door operator input and corresponding microprocessor input to a selected program module corresponding to a selected function to be performed by the door operator.

12 Claims, 5 Drawing Sheets

(51) Int. Cl.
  *E05F 15/73* (2015.01)
  *G05B 19/042* (2006.01)
  *G05B 19/409* (2006.01)
(52) U.S. Cl.
  CPC ........... *E05F 15/73* (2015.01); *E05Y 2400/10* (2013.01); *E05Y 2400/81* (2013.01); *E05Y 2400/85* (2013.01); *G05B 2219/40062* (2013.01)

(56) References Cited

U.S. PATENT DOCUMENTS

| | | |
|---|---|---|
| 5,479,151 A | 12/1995 | Lavelle et al. |
| 6,181,255 B1 | 1/2001 | Crimmins et al. |
| 6,963,266 B2 | 11/2005 | Palomaki et al. |
| 7,107,379 B2 | 9/2006 | Bauerfeind et al. |
| 7,737,860 B2 | 6/2010 | Banta et al. |
| 2008/0289377 A1 | 11/2008 | Alef |
| 2010/0115853 A1* | 5/2010 | Gebhart .................. H02P 6/085 49/506 |
| 2012/0255232 A1 | 10/2012 | Gayhart |
| 2013/0127590 A1 | 5/2013 | Braverman et al. |
| 2013/0186001 A1* | 7/2013 | Cui .......................... E06B 9/68 49/31 |
| 2014/0125499 A1 | 5/2014 | Cate et al. |

* cited by examiner

METHODS AND APPARATUS FOR INCREASING THE RANGE OF DIGITAL INPUTS AND OUTPUTS ON A DOOR OPERATOR OR CLOSER

BACKGROUND OF THE INVENTION

1. Field of the Invention

This invention relates to door operators and closers which function to open and/or close a door in response to an electrical control signal.

2. Description of Related Art

Current door operator or closer units are provided with relays that are coded for a specific trigger. The end user wires up the unit to take advantage of that trigger. Current default choices are often when activated for an electric strike or magnetic lock. If a customer would like the relays to signal something else it would have to be a special build unit or extra hardware must be added to accomplish the change in functionality. Likewise, inputs to the door operator such as switches need to be directly wired to specific inputs to perform a particular function.

SUMMARY OF THE INVENTION

Bearing in mind the problems and deficiencies of the prior art, it is therefore an object of the present invention to provide a door operator having programmable inputs and outputs.

It is another object of the present invention to provide a door operator that uses a single set of inputs and outputs.

A further object of the invention is to provide a door operator that controls the inputs and outputs for a desired purpose by software with field programmable and settable functions for the inputs and outputs.

It is yet another object of the present invention to provide a door operator that increases the range of possible inputs, outputs and combinations thereof to and from the operator without increasing the hardware required to implement the relays, or the wiring to install the unit.

Still other objects and advantages of the invention will in part be obvious and will in part be apparent from the specification.

The above and other objects, which will be apparent to those skilled in the art, are achieved in the present invention which is directed to a door operator comprising a door driver for opening and closing a door, and a control system including a microprocessor having multiple microprocessor inputs. The microprocessor is connected to and controls the door driver. The microprocessor has multiple program modules corresponding to input functions to be performed by the door operator. The door operator includes a plurality of door operator inputs connected to corresponding ones of the microprocessor inputs, and a user interface connected to the microprocessor. A user interface is connected to the microprocessor, and allows' a user to select at least one door operator input and corresponding microprocessor input from among the plurality of door operator inputs, select at least one function to be performed by the door operator from among the multiple door operator functions and corresponding program modules, and associate the selected door operator input and corresponding microprocessor input with the selected program module and corresponding selected function to be performed by the door operator. The door operator then performs the selected function when triggered at the selected door operator input.

Additionally, the microprocessor may further include multiple microprocessor outputs connected to multiple corresponding door operator outputs and output program modules corresponding to output functions. The user interface allows interconnection between desired output functions and desired door operator outputs. A plurality of output interface circuits may be connected between the microprocessor outputs and the door operator outputs.

In a related aspect the present invention is directed to a method, of controlling a door operator having a door driver for opening and closing a door. The method comprises providing the door operator described above, selecting a door operator input and corresponding microprocessor input, selecting a function to be performed by the door operator, and associating the selected door operator input and corresponding microprocessor input to the program module corresponding to the selected function.

In another aspect the present invention is directed to a door operator comprising a door driver for opening and closing a door, and a control system including a microprocessor having multiple microprocessor outputs. The microprocessor is connected to and controlling the door driver. The microprocessor has multiple program modules corresponding to output functions to be performed by the door operator. The door operator includes a plurality of door operator outputs connected to corresponding ones of the microprocessor outputs, and a user interface connected to the microprocessor. A user interface is connected to the microprocessor, and allows a user to select at least one door operator output and corresponding microprocessor output from among the plurality of door operator outputs, select at least one output function and corresponding program module from among the multiple output functions, and associate the selected door operator output and corresponding microprocessor output with the selected program module corresponding to the selected output function to be performed by the door operator. The selected door output is then triggered when the selected output function is performed Additionally, the microprocessor may further include multiple microprocessor inputs connected to multiple corresponding door operator inputs and input program modules corresponding to input functions. The user interface allows interconnection between selected input functions and selected door operator inputs. A plurality of input interface circuits may be connected between the microprocessor inputs and the door operator inputs.

In a related aspect the present invention is directed to a method of controlling a door operator having a door driver for opening and closing a door. The method comprises providing the door operator described above, selecting a door operator output and corresponding microprocessor output, selecting a function to be performed by the door operator, and associating the selected door operator output and corresponding microprocessor output to the program module corresponding to the selected function.

BRIEF DESCRIPTION OF THE DRAWINGS

The features of the invention believed to be novel and the elements characteristic of the invention are set forth with particularity in the appended claims. The Fig.s are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the embodiments of the present invention, reference will be made herein to FIGS. 1-9 of the drawings in which like numerals refer to like features of the invention.

The present invention relates to the control system for door operators and to the inputs and outputs of the control system. (Unless otherwise indicated, the term door operator herein includes door opener and door closer, and the terms may be used interchangeably.) Door operators refer to powered devices having the capability of driving a door between the open and closed positions. The control system employs a microprocessor, microcontroller, digital signal processor and/or other type of programmable digital computer or central processing unit, and these terms may be considered to be interchangeable unless otherwise noted. The control system inputs receive an electrical control signal from one or more switches or sensors to trigger a corresponding door operator function, such as opening the door, closing the door, holding the door open, and the like. The door operator outputs may be connected to an electric strike or to a magnetic lock or to another door operator. The present invention is user programmable door operator having multiple inputs, multiple outputs and multiple functions performed by the door operator, and may employ a user interface to permits interconnection of multiple different types of sensors and switches to different inputs to actuate different door operator functions and configuration of the door operator to activate different outputs.

Figure 1:
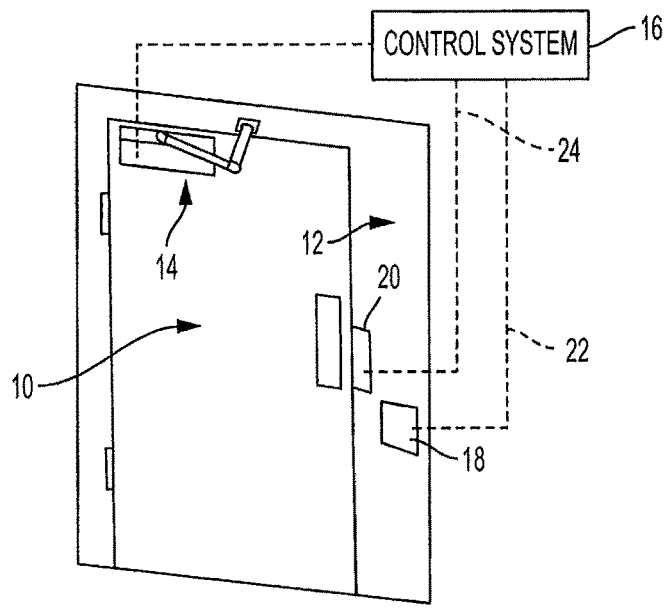
FIG. 1 is a block diagram showing an embodiment of the door operator and control system of the present invention installed on a door.

Referring to FIG. 1, a swing door 10 mounted in a door frame 12 is provided with a door operator 14 according to the present invention. The door operator may be mounted on the door 10 as shown or on frame 12 on the pull side of the door as shown, i.e., the side of the door in the direction of travel, or on the opposite push side of the door, i.e., the side of the door opposite the direction of travel. The door operator 14 includes a control system 16. Control system 16 may be located on or within the door closer, or may be located remotely from the door operator. Control system 16 signals a driver within the door operator 14 to open and close the door 10 responsive to control signals. Communication between control system 16 and door operator 14 may be by wire or wirelessly.

The control signals may be received from any one of a variety of different types of inputs such as the activation switch 18. The activation switch 18 is typically a button located near the door which when pressed causes the door operator 14 to open the door. The activation switch 18 is connected to an input of the control system 16 through wire or line 22. Additional devices may be connected to other inputs of the control system, and such additional devices may be fire control systems to signal the door to close or open, locking systems, and the like.

The inputs described above may be referred to as door operator inputs. In addition to multiple inputs to the control system 16, the control system may be provided with multiple door operator outputs, such as electric strike 20 connected to an output of the control system via wire or line 24. Alternatively, communication between control system 16 and the various inputs and outputs described herein may be accomplished wirelessly.

Figure 2:
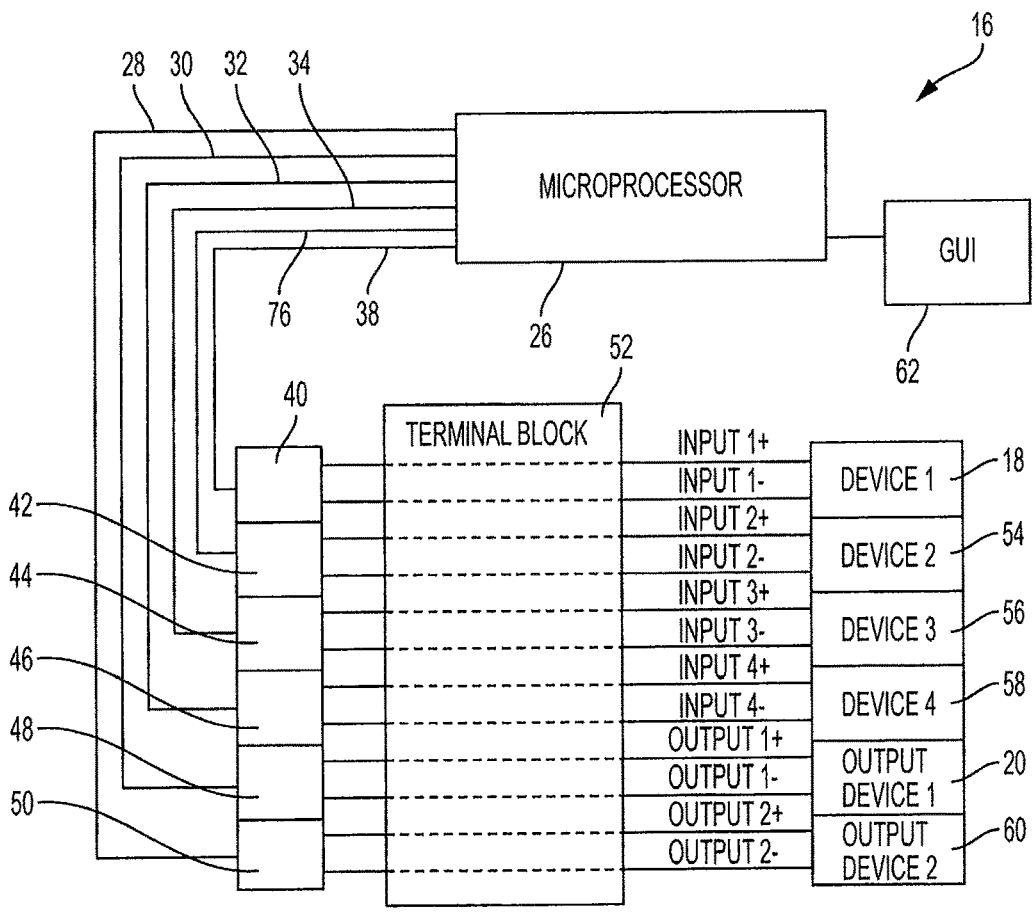
FIG. 2 is a block diagram showing an embodiment of the control system seen in FIG. 1 for the door operator of the present invention, showing multiple programmable general purpose input outputs (GPIOs).

FIG. 2 shows the door opener control system 16 seen in FIG. 1. A microprocessor 26 provides digital control of the door operator. The microprocessor 26 may be a conventional microcontroller, a digital central processing unit or other type of digital controller. The microprocessor 26 is provided with six general purpose input outputs (GPIOs) 28, 30, 32, 34, 36 and 38, each of which is provided with a corresponding connection line connecting to the microprocessor 26.

The inputs to the microprocessor 26 may be referred to as microprocessor inputs. In some embodiments of the present invention, the inputs will be GPIOs configured as inputs. In other embodiments, the microprocessor will have dedicated inputs that cannot be configured as outputs.

In the embodiment of the invention illustrated, four of the GPIOs are configured as inputs. These include GPIOs 32, 34, 36 and 38. Two of the GPIOs are configured as outputs. These include GPIOs 28 and 30. By way of example and with reference to FIG. 1, device 1 corresponds to activation switch 18 in FIG. 1 and is connected through input 1 positive and input 1 minus to terminal block 52. The input of device 1 is then connected through input interface circuit 40 via line 38 to microprocessor 26. In a similar manner device 2 (indicated with reference numeral 54) is connected through input 2 positive and input 2 minus through the terminal block 52 and input interface circuit 42 via line 36 to the microprocessor 26.

In a similar manner, devices 3 and 4, reference numerals 56 and 58, respectively, are connected through their corresponding positive and negative input wires 3 and 4 to terminal block 52 and from there to their corresponding input interface unit 44 and 46, respectively. Alternatively, devices 1 through 4 may be any other type of output or input device desired.

The two GPIOs configured as outputs 28 and 30 are connected through output interface circuits 48 and 50 through the terminal block 52 and corresponding positive and negative output wires 1 and 2 to output device 1 and output device 2, respectively. Output device 1 may correspond to the electric strike 20 in FIG. 1. Output device 2, indicated with reference number 60, may be any other type of output device. By way of example, output device 60 may be a connection to a magnetic lock. Alternatively, it may be connected to signal the status of the door or it may be connected as a daisy chain connection another door operator according to the present invention.

Microprocessor 26 is provided with computer code corresponding to functions that may be implemented by the door operator. A typical function may be simply to open the door, hold the door open for a period of time, and then close the door. This function may be referred to as the activate function. Typically, the activate function would be operated by a switch 18 as indicated in FIG. 1. A simple switch contact of this type may be referred to as a dry contact switch. Other types of devices to control the microprocessor may provide other types of signaling methods. Digital high low voltage may be used, or a current signal may be used. Accordingly the connection to the microprocessor GPIO is first passed through one of the input interface circuits 40, 42, 44 or 46.

The input interface circuits 40, 42, 44 and 46 are illustrated in FIGS. 3, 4, 5, 6 and 7. Each of these circuits corresponds to a different type of input device providing a different signal and the interface circuit shown provides an appropriate signal to its corresponding GPIO on micro processor 26. Any of the circuits in FIGS. 3-7 (as well as any other circuits) may be used in any of the input interface circuits 40, 42, 44 or 46 illustrated in FIG. 2.

Figure 3:
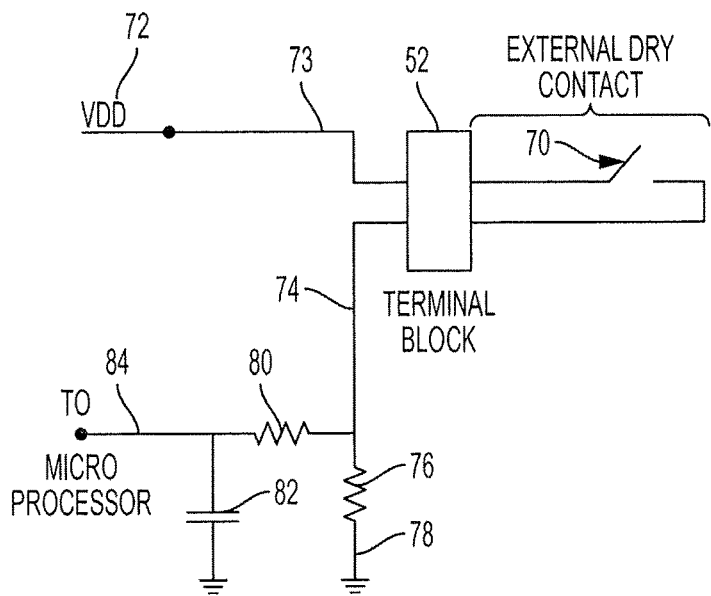
FIG. 3 is a diagram of a normally low, low-pass C filtered, input circuit for use with a dry contact switch, which may be located at any one of the GPIO interface circuits shown in FIG. 2.

FIG. 3 shows a normally low low-pass C filtered input for use with a dry contact switch 70. External dry contact switch 70 is connected to terminal block 52. A voltage supply 72 VDD is connected thru wire or line 73 through terminal block 52 and switch 70 to line 74 and resistor 76 to ground 78 resistors 76 and 80 act with capacitor 82 as a low pass filter before connection is made to the microprocessor GPIO at output 84, which may be connected to any one of the GPIOs 32, 34, 36 or 38 of microprocessor 26. When switch 70 is closed, the voltage VDD is applied to the junction of resistors 76 and 80 and output 84 goes high. When switch 70 is open, the output at 4 goes low as capacitor 82 drains to ground 78 through resistors 76 and 80.

Figure 4:
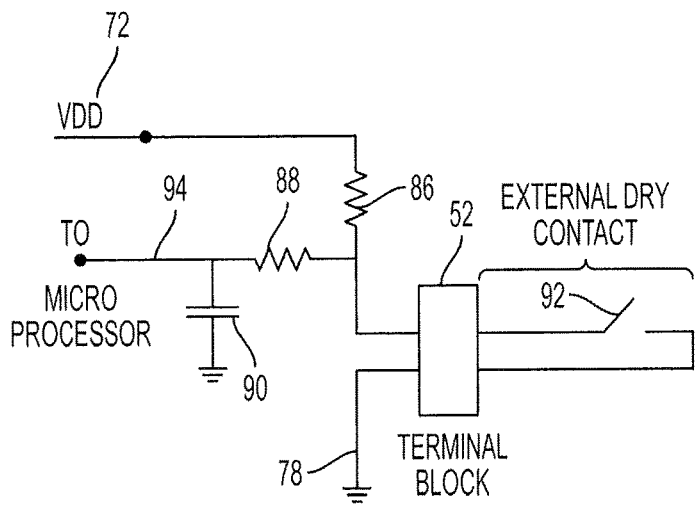
FIG. 4 is a diagram of a normally high, low-pass C filtered, input circuit for use with a dry contact switch, which may be located at any one of the GPIO interface circuits shown in FIG. 2.

FIG. 4 is a normally high low pass C filter. Resistors 86 and 88 cooperate with capacitor 90 to form the low pass filter. When dry contact switch 92 is closed, capacitor 19 will drain through resistor 88 to ground at and output 94 to the microprocessor will go low. When switch 92 is open, capacitor 90 will charge from voltage source 72 to bring the output 94 to the microprocessor high.

Figure 5:
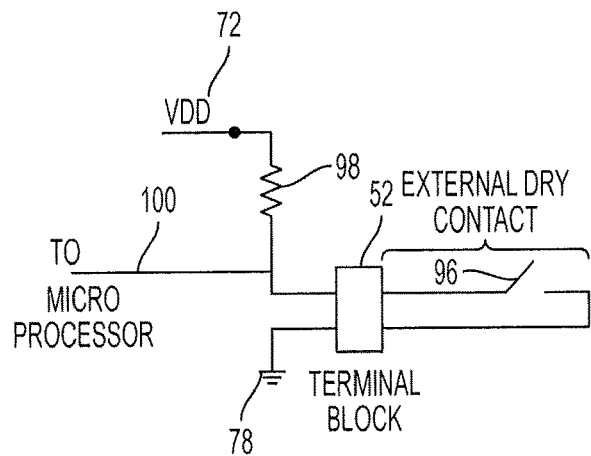
FIG. 5 is a diagram of a normally high, non-filtered input circuit for use with a dry contact switch, which may be located at any one of the GPIO interface circuits shown in FIG. 2.

The circuit of FIG. 5 is similar to FIG. 4, except that the input signal is not filtered. When switch 96 is closed, resistor 98 is connected to ground and output 100 goes low. When switch 96 is open output 100 goes high.

Figure 6:
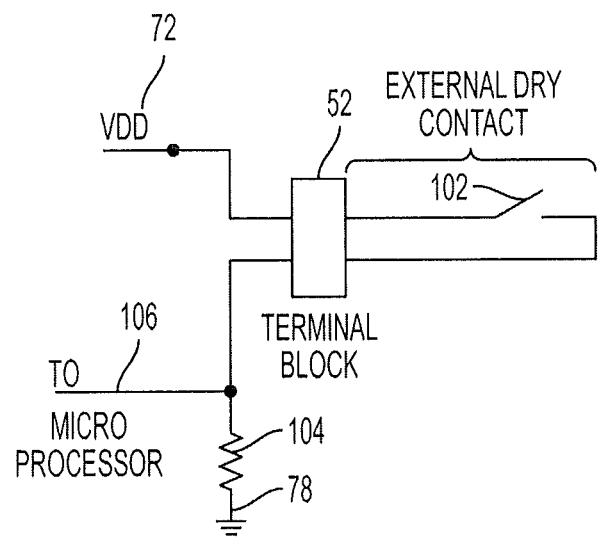
FIG. 6 is a diagram of a normally low non-filtered input circuit for use with a dry contact switch, which may be located at any one of the GPIO interface circuits shown in FIG. 2.

The FIG. 6 circuit is similar to FIG. 3 except that the output is not filtered. When switch 102 is closed, output 106 goes high as it is connected to VDD 72. When switch 102 is opened, resistor 104 connects output 106 to ground 78 and output 106 goes low. Resistor 104 draws output 106 low to ground 78 when switch 102 is open.

Figure 7:
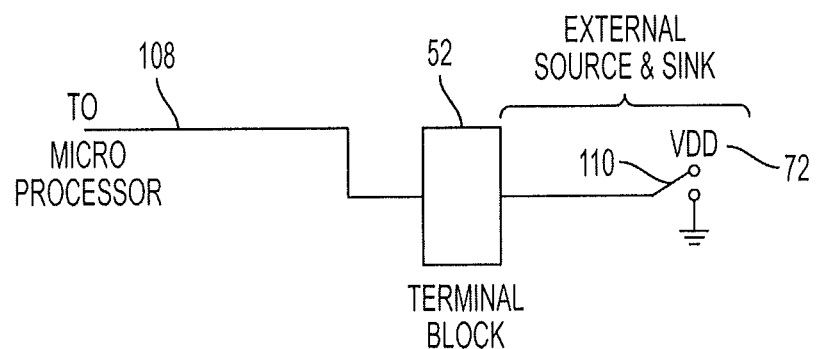
FIG. 7 is a diagram of an externally driven input circuit, which may be located at any one of the GPIO interface circuits shown in FIG. 2.

In the circuit of FIG. 7, switch 110 directly connects an external voltage VDD 72 through terminal block 52 to output 108. In this design the input is externally driven and ground and voltage levels as well as source and sink currents must be externally controlled and regulated to match the microcontroller input requirements.

The circuits in FIGS. 3-7 may be designed for dry contact switches but may provide various types of filtering and/or other input circuit processing of the input signal. It will be understood that different input devices 18, 54, 56 or 58 may be used to initiate any one of multiple different types of functions performed by microprocessor 26. In general, most input devices provide a dry contact switch to signal the microprocessor to perform a function. However different third-party manufacturers provide a different input devices with different input signals and which require a different input signal processing by circuits 40, 42, 44 or 46.

Thus, it may be desirable to connect an activate switch from one manufacturer to input interface circuit 40 and GPIO 38 while another manufacturer's device may need to be connected through the input interface circuit 44 to GPIO 34.

In previous door operator designs, a specific input, for example input 38, would need to be directly linked to a particular function in microprocessor 26. In the present invention however be different inputs maybe configured to trigger different functions within microprocessor 26. Accordingly, if a particular manufacturers input device needs processing according to circuits 44, it can be connected at input 56 as device 3 and the microprocessor configured by the end user via user interface circuit 62.

Interface circuit 62 may be as simple as a set of jumpers on a circuit board. It may alternatively be a single or multi line alpha numeric display in which the user selects desired correspondence between different inputs and the different GPIOs of microprocessor 26. The user interface circuit 62 may also employ a display, for example, a touch screen graphical user interface (GUI), which allows the user to connect different inputs to different programmed functions performed by the microprocessor and the door operator. This user interface may also be allowed to adjust parameters of different functions such as the duration for the door to remain open and the like.

Figure 8:
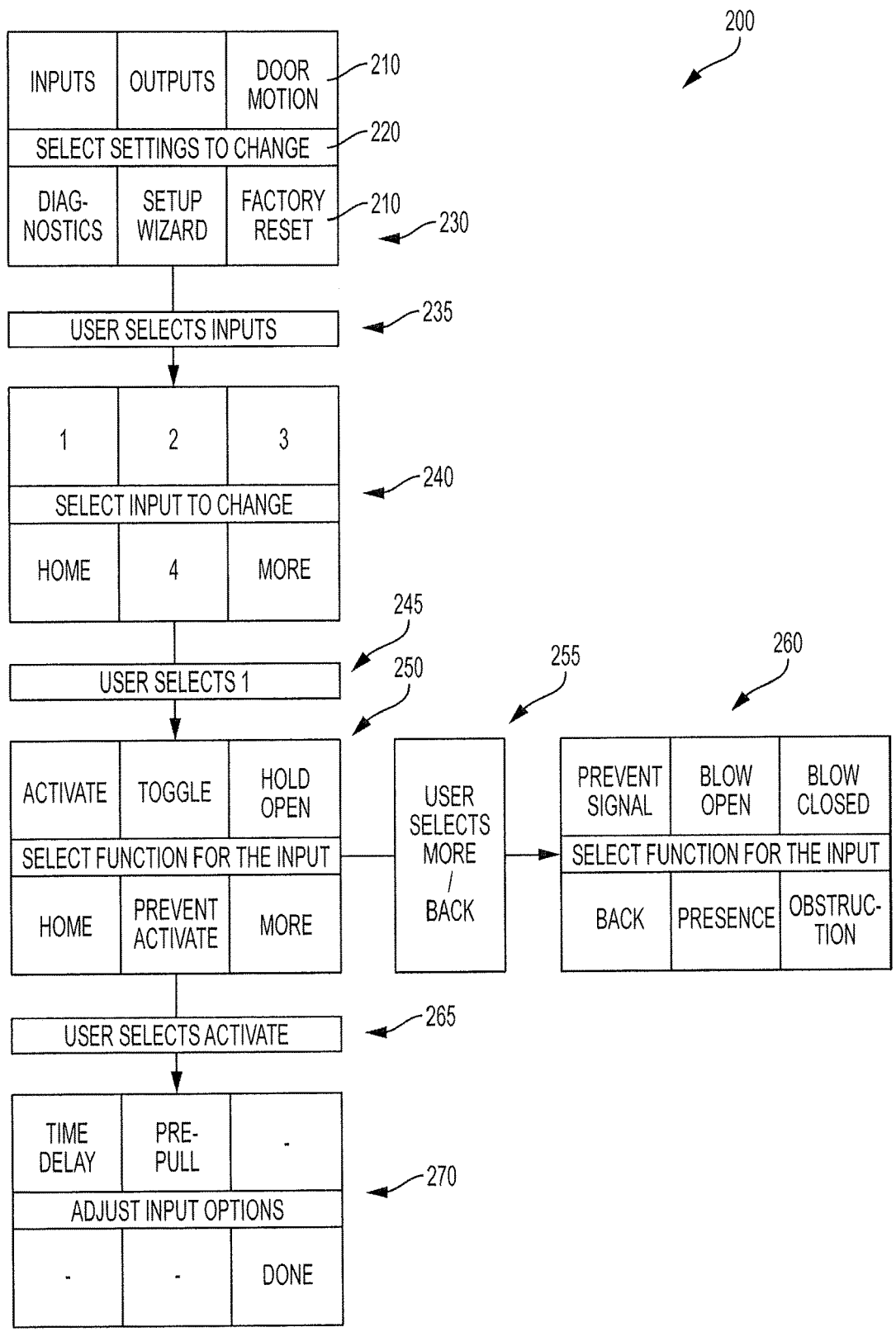
FIG. 8 is a flow diagram of a graphical user interface for use with the control system shown in FIGS. 1 and 2.

FIG. 8 provides an exemplary GUI which would allow programming by the user/installer of all switches used to activate the door presence sensors and the like. The example is a flow of screens visible on the GUI to the user with the switches to change settings for the inputs/outputs, input/output device numbers, functions and activations, with selection each dropping into a settings screen. The switches would be displayed on the GUI screen 200 as separate blocks of options with soft icons or buttons 210 and a scrolling text bar 220 in the middle. In an initial block of buttons 230 the user may select basic door operation parameters such as door motion settings, diagnostics, setup wizard or factory rest of all setting, and may also select whether to use the control system of the present invention to set up any additional door operator input or output functions such as a wall switch, presence sensor, or any other input or output including but not limited to those described herein. Before such step the user connects the desired input or output device to the wires on the terminal block associated with one of the GPIOs, as shown in FIG. 2. After selecting on block 230 whether to install an input or output, e.g. selecting input 235, the user then selects on block 240 the particular GPIO to change, that is, the GPIO to which the device is connected, e.g., as device no. 1, 245. The user then selects on block 250 the particular function for the input and, if the function is not show, selects more options 255, after which additional function blocks 260 are displayed. If for example activate is selected 265, the user is then presented with the settings block 270 for that function, and the particular settings options are presented and the user may select and change those settings by subsequent setting screens. The GUI shown and identifies to the controller the selected door operator input or output and corresponding microprocessor input or output to the program module corresponding to the selected function to be performed.

By way of example, in one installation a particular door activation switch will be connected as device 1 to trigger the activate function. A second input connected as device 2 may be a signal from a fire control system allowing individuals to open doors from the inside to exit the building but prohibiting doors from being opened from the outside to prevent entrance into the building. Yet another input device connected as device 3 may be used to lock all doors.

A very large number of possible functions can be programmed into microprocessor 26 and the interface circuit 62 can be used to connect any one of the inputs to act as a trigger for any particular desired function. In this way a very limited number of inputs can be used to trigger a limited subset of a very large number of possible door functions.

Few users may need all of the different functions available. Moreover, a single input can be used to trigger multiple different functions or multiple inputs can be used to trigger a single function. All of this interconnection between the specific inputs 18, 54, 56 or 58 and the corresponding GPIOs of microprocessor 26 comprising GPIOs 32, 34, 36 or 38 is accomplished through the interface circuit 62.

User interface 62 may also be used to program the interconnection of different output devices via any of the GPIOs shown in FIG. 2, for example, GPIOs 28 and 30 configured as outputs and connecting through output interface circuits 48 and 50 to output device 1 and output device 2. Output device 1 may be the electric strike 20 shown in FIG. 1 and output device 2 may be any other desired type of output device. As described above, the GUI 62 forming the user interface may be used to trigger either or both of the outputs. The output signal may be selected from different output options available and the functions programmed into microprocessor 26. The output interface circuits 48 and 50 may be as simple as a relay or additional power and other signal processing may be provided through these circuits to the corresponding output device. Different types of output and output circuit are well known in the art for this application.

Figure 9:
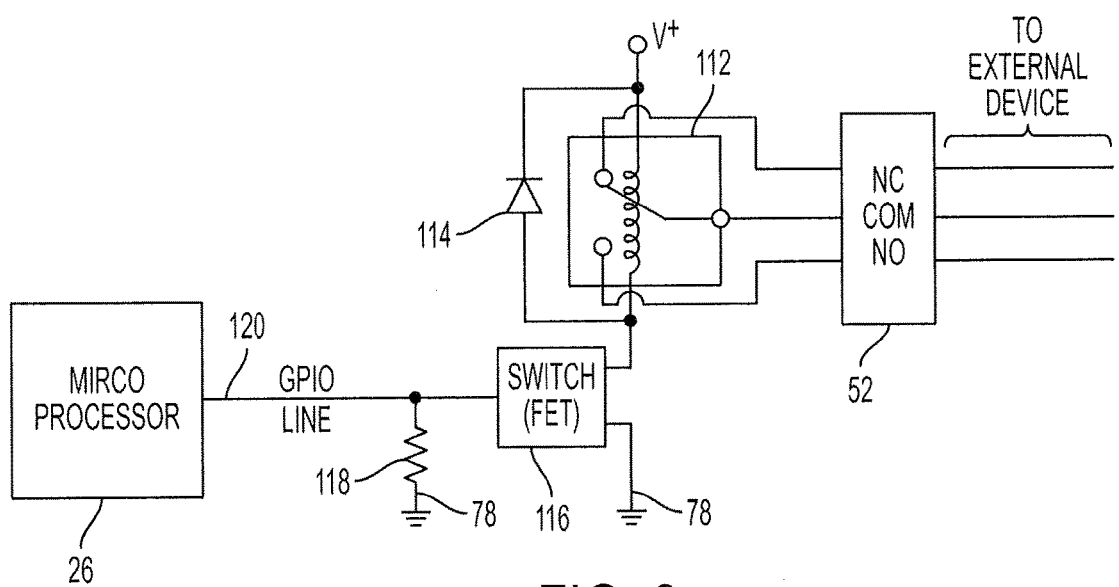
FIG. 9 is a diagram of an output interface circuit employing a relay, which may be located at any one of the GPIO output interface circuits shown in FIG. 2.

An example is shown in FIG. 9 of one possible output interface circuit 48, 50 illustrated in FIG. 2. Referring to FIG. 9, an external output device is connected to terminal block 52. Terminal block 52 includes door operator outputs and the outputs may include a normally closed connection or normally open connection as well as a common. This allows relay 112 to act as a dry contact switch to drive a desired external device in either normally open or normally closed operation under the control of microprocessor 26. Relay 112 is a conventional single pole double throw relay. Voltage spike protection is provided by diode 114 in a conventional manner. FET 116 drives relay 112 between open and closed positions by acting as a switch to connect the relay to ground 78 under control of GPIO 120 of microprocessor 26. GPIO 120 acts as a connection between microprocessor 26 and switch 116 with resistor 118 acting to bias FET 116 in a conventional manner to permit microprocessor 26 to control FET 112.

When the output interface circuit of FIG. 9 is positioned at block 48 in FIG. 2, GPIO 120 corresponds to GPIO 30 in FIG. 2. When the output interface circuit of FIG. 9 is located at block 50 in FIG. 2, GPIO 120 corresponds to GPIO 30 in FIG. 2. it will be understood that various different embodiments of output interface circuits may be used at positions 48 and 50 or the same interface circuit may be used at both positions to correspond to the requirements of the external output device 20 or 60 be controlled (refer to FIG. 2).

Microcontroller 26 may be programmed with one or more of a variety of door functions. Some of these functions may be selected from the following and/or many additional functions may be added:

ACTIVATE: A standard wall button, RF device detector, credential detector (proximity card or fob), which is used to start a standard cycle.
1. When closed drives the unit to the open state.
2. When opening does nothing.
3. When in hold open resets the hold open time.
4. When closing cuts power to the motor, waits for the door to slow down, then goes into the opening state.

EXECUTIVE TOGGLE FUNCTION: A device that signals the unit to step to the next location.
1. When closed it sends the unit to the open position with infinite no power time at hold open.
2. When opening does nothing.
3. When in hold open sends the unit to the closed position.
4. When closing cuts power to the motor, waits for the door to slow down, then goes into the opening state.

HOLD OPEN: A device that signals the unit to remain in the hold open state until no signal.
1. When closed does nothing.
2. When opening does nothing.
3. When in hold open holds the door open and sets a hold open de-bounce time (may do executive command override).
4. When closing does nothing.

PREVENT ACTIVATION: A device that signals the unit to not respond to an activation command because there is an obstruction in the door path.
1. When closed it cancels an activate command. Command can be saved for x seconds waiting for the obstruction to clear.
2. When opening does nothing.
3. When in hold open does nothing (may prevent executive commands) (if the hold open is indefinite and an input comes in to end the hold open the prevent input can prevent the action of that input).
4. When closing does nothing.
5. When activated disables one or more inputs, for example, disable one wall switch but leave the other in play.

PREVENT SIGNAL: A device that signals the unit to ignore another input when active.
1. Always.

BLOW OPEN: A device that signals the unit to immediately open and remain in the position until the signal is removed (obstruction detection may be selectable active or not).
1. When closed sends the door to the open state with infinite hold open time.
2. When opening changes the hold open time to infinite.
3. When in hold open makes the unit remain there for an unlimited time. Disables all other inputs from commanding a closing.
4. When closing cuts power to the motor, waits for the door to slow down, then goes into the opening state with infinite hold open time.
5. Allows for a Fire Key input to cancel the blow open and close the door.

BLOW CLOSED: A device that signals the unit to immediately close and remain closed until the signal is removed, and may accept a signal from fire or smoke system (obstruction detection may be selectable active or not)

1. When closed remains there and disables other inputs from opening the door.
2. When opening cuts power to the motor, waits for the door to slow down, then goes into the closing state.
3. When in hold open immediately goes into the closing state cutting short any hold open time.
4. When closing disables other inputs from commanding the door to open.
5. In addition to closing and latching doors on signal, may provide an output to lock the door once the home position is reached.

PREVENT HOLD-OPEN COMBO: A prevent and hold open device, i.e., a safe zone on the pull-side of a door.
1. When fully closed act as a prevent device (may be side of the door specific).
2. When opening do nothing.
3. When fully open act as a hold open device.
4. When closing do nothing.
5. When opening and an obstruction is detected stop the door and pause (programmable) or return to closed state until the obstruction is clear and then re-open.
6. May make unit stop on closing if prevent receives a signal. May reopen.

OBSTRUCTION (superscan): A signal of this type indicates that the unit has an obstruction it is about to hit or is already hitting, and only works when the door is in motion.
1. When opening stop the unit and brake. Once full stop follow software settings on how to act in regards to obstructions (stop and hold, reverse direction, etc.).
2. When closing stop the unit and brake. Once full stop follow software settings on how to act in regards to obstructions.

OBSTRUCTION (bodyguard): A signal of this type indicates that the unit has an obstruction it is about to hit or is already hitting, and only works when the door is not in motion.
1. When closed act as a prevent device.
2. When fully open act as a hold open device until the obstruction signal has gone away.

OBSTRUCTION (not existing yet): A signal of this type indicates that the unit has an obstruction it is about to hit or is already hitting, and always works.
1. When closed act as a prevent device.
2. When opening stop the unit and brake. Once full stop follow software settings on how to act in regards to obstructions (stop and hold, reverse direction, etc.).
3. When fully open act as a hold open device until the obstruction signal has gone away.
4. When closing stop the unit and brake. Once full stop follow software settings on how to act in regards to obstructions.

In one embodiment of the invention, each of the available inputs at a GPIO corresponds to a register in the microprocessor 26. When an input triggers, the corresponding register is marked with a flag. The GUI is then used to interconnect the reticular input to any one of the above available functions and or any other function which may be performed by the door operator. In addition, output functions may be connected with the GUI to internal registers associated with GPIOs 28 or 30 to perform desired output functions. Typically an output will include a relay to connect to an external output device or switched power (possibly SS). In this way programmable relay outputs are provided and multiple different outputs and output functions maybe interconnected to be triggered by the microprocessor 26.

Typical outputs may include any of the following:
TURN ON AN AUXILIARY DEVICE: To activate another device upon opening or closing. This could be a light source for safety, another set of doors (vestibule), a parking gate, security camera. This may require options for time delay and timer untill discontinue signal (signal on, count for xx seconds and send another signal to signal off).
WHEN ACTIVATED:
WHEN FAULT IS PRESENT:
WHEN DOOR POSITION>X DEGREES:
WHEN DOOR POSITION<X DEGREES:
DRIVER FOR ELECTRIC STRIKE:
DRIVER FOR MAG LOCK: (inverse of electric strike)
REPEATER: (just repeats any of the inputs)

The present invention results in a door operator having programmable inputs and outputs, the latter preferably including relays. When a selected input is triggered, typically by the closing of a dry contact switch connected to the selected door operator input, the door operator executes a selected function. In the preferred embodiment, any input may be used to initiate any desired function. Similarly, any selected output function may be associated with any desired output. For example, an output relay may signal when the door is open for smoke evacuation systems, when the door is closed for security, or when the unit is working correctly. The relays may also be used for electric strikes, and other output devices requiring more power than can be produced by the microcontroller.

Instead of requiring separate inputs and outputs for each function, a single set of inputs and outputs may be used, with the input and output controlled for a desired purpose by field changeable or settable software in the door operator or closer.

The programmable relay output serves to increase the range of possible outputs from an operator or closer without increasing the hardware required to implement the relays, or the wiring to install the unit. This allows one set of hardware to service many customer needs such as signaling when the door is open, signaling when the door is shut, signaling when the door is activated, signaling a fault within the unit, signaling when specific inputs are triggered (can daisy chain devices to multiple units), and/or signaling when the unit is timed off (bank mode).

To implement the programmable relay outputs one or more of the following may be included in the unit: 1) a user interface (optical or jumpers or switches) to allow the preferred functionality of each relay to be selected; 2) relays that are controlled by GPIO (general purpose input/output) pins on the microcontroller (or a sub device accomplishing the same aspect); and/or 3) a software architecture which includes the hooks for each of the selectable output modes.

An embodiment of a door closer and controller of the present invention may take the form of an entirely hardware embodiment, or an embodiment that uses software (including firmware, resident software, micro-code, etc.). Furthermore, an embodiment may take the form of a computer program product on a tangible computer-usable storage medium having computer-usable program code embodied in the medium. A memory device or memory portion of a processor 26 as shown in FIG. 2 can form the medium. Computer program code or firmware to carry out an embodiment of the present disclosure could also reside on optical or magnetic storage media, especially while being transported or stored prior to or incident to the loading of the computer program code or firmware into a door closer. This computer program code or firmware can be loaded, as an example, through the GUI 62 of FIG. 2 by connecting a computer system or external controller to the programming interface.

It should be appreciated and understood that the present invention may be embodied as systems, methods, apparatus, computer readable media, non-transitory computer readable media and/or computer program products. The present invention may take the form of an entirely hardware embodiment, an entirely software embodiment (including firmware, resident software, micro-code, etc.) or an embodiment combining software and hardware aspects that may all generally be referred to herein as a "circuit," "module" or "system." The present invention may take the form of a computer program product embodied in one or more computer readable medium(s) having computer readable program code embodied thereon.

One or more computer readable medium(s) may be utilized, alone or in combination. The computer readable medium may be a computer readable storage medium or a computer readable signal medium. A suitable computer readable storage medium may be, for example, but not limited to, an electronic, magnetic, optical, electromagnetic, infrared, or semiconductor system, apparatus, or device, or any suitable combination of the foregoing. Other examples of suitable computer readable storage medium would include, without limitation, the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. A suitable computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computing device (such as, a computer), partly on the user's computing device, as a stand-alone software package, partly on the user's computing device and partly on a remote computing device or entirely on the remote computing device or server. In the latter scenario, the remote computing device may be connected to the user's computing device through any type of network, including a local area network (LAN) or a wide area network (WAN), or the connection may be made to an external computing device (for example, through the Internet using an Internet Service Provider).

The present invention is described herein with reference to flowchart illustrations and/or block diagrams of methods, apparatus (systems), computer readable media, non-transitory computer readable media, and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computing device (such as, a computer), special purpose computing device, or other programmable data processing apparatus to produce a machine, such that the instructions, which execute via the processor of the computing device or other programmable data processing apparatus, create means for implementing the functions/acts specified in the flowchart and/or block diagram block or blocks.

These computer program instructions may also be stored in a computer readable medium that can direct a computing device, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computing device, other programmable data processing apparatus, or other devices to cause a series of operational steps to be performed on the computing device, other programmable apparatus or other devices to produce a computer implemented process such that the instructions which execute on the computing device or other programmable apparatus provide processes for implementing the functions/acts specified in the flowchart and/or block diagram block or blocks.

It should be appreciated that the function blocks or modules shown in the drawings illustrate the architecture, functionality, and operation of possible implementations of systems, methods and computer program media and/or products according to various embodiments of the present invention. In this regard, each block in the drawings may represent a module, segment, or portion of code, which comprises one or more executable instructions for implementing the specified logical function(s). It should also be noted that, in some alternative implementations, the functions noted in the block may occur out of the order noted in the figures. For example, the function of two blocks shown in succession may, in fact, be executed substantially concurrently, or the blocks may sometimes be executed in the reverse order, depending upon the functionality involved. It will also be noted that each block and combinations of blocks in any one of the drawings can be implemented by special purpose hardware-based systems that perform the specified functions or acts, or combinations of special purpose hardware and computer instructions. Also, although communication between function blocks or modules may be indicated in one direction on the drawings, such communication may also be in both directions.

The present apparatus and method makes the input and output relay triggers programmable and user selectable. Within the control software sections of code exist for a number of different possible input or output relay triggers. These triggers include but are not limited to those mentioned above. Around either these triggers or where the trigger code section input or output connects to the area of the code controlling the GPIO registers a selective structure is used. This would allow a number of triggers limited only by code size.

On the user interface of the operator the end user can select which trigger to map to each input or output relay. Alternately the user may unmap a relay completely and use the connector on the board as a DC output connection. There may be provided an optional sink resistor if microcontroller does not provide adequate sink and source capabilities.

The following is an example of pseudocode for an output function, wherein almost any structure can be used to accomplish the programmable output relay idea.

Example

//trigger for door activated (electric strike functionality)
if the activation button is pressed and all filtering checks and error checks say the door should be commanded to open
  set trigger for activation button pressed to true
end if
//area mapping trigger to GPIO register of the relay
if the trigger for activation==true and relay selection==activation
  set GPIO register for relay to true
end if Thus, the present invention achieves one or more of the objects above and provides a door operator having programmable inputs and outputs; uses a single set of inputs and outputs; controls the inputs and outputs for a desired purpose by programmable software in the door operator or closer; and/or increases the range of possible outputs from an operator or closer without increasing the hardware required to implement the relays, or the wiring to install the unit.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A door operator comprising:
    a door driver for performing a plurality of door functions on a door;
    a control system including a microprocessor having a plurality of field programmable microprocessor inputs;
    the microprocessor connected to and controlling the door driver, the microprocessor having a plurality of program modules corresponding to the plurality of door functions, the program modules being selectively mapped to the microprocessor inputs such that a selected one of the microprocessor inputs is mapped to a selected one of the program modules;
    a plurality of door operator inputs connected to corresponding ones of the microprocessor inputs, each of the plurality of door operator inputs being connected to one of the microprocessor inputs by an input interface circuit such that an input device may be connected to one of the microprocessor inputs via an appropriate input interface circuit; and
    a user interface connected to the microprocessor for identifying to a controller a mapping of the selected one of plurality of the program modules to the selected one of the microprocessor inputs, the user interface configured to: select at least one door operator input and corresponding microprocessor input from among the plurality of door operator inputs, select at least one door function from among the plurality of door functions and corresponding program modules, whereby the door operator performs the selected function when triggered at the selected door operator input.

2. The door operator of claim 1 wherein the microprocessor further includes multiple field programmable microprocessor outputs connected to multiple corresponding door operator outputs and output program modules corresponding to output functions and wherein the user interface allows interconnection between desired output functions and desired door operator outputs.

3. The door operator of claim 2 further including a plurality of output interface circuits connected between the microprocessor outputs and the door operator outputs.

4. A door operator comprising:
    a door driver for performing a plurality of output functions on a door;
    a control system including a microprocessor having a plurality of multiple field programmable microprocessor outputs;
    the microprocessor connected to and controlling the door driver, the microprocessor having a plurality of program modules corresponding to the plurality of output functions;
    a plurality of door operator outputs connected to corresponding ones of the microprocessor outputs, each of the plurality of door operator outputs being connected to one of the microprocessor outputs by an output interface circuit such that an output device may be connected to one of the microprocessor outputs via an appropriate output interface circuit; and
    a user interface connected to the microprocessor for identifying to a controller a mapping of the selected one of plurality of the program modules to the selected one of the microprocessor outputs, the user interface configured to select: at least one door operator output and corresponding microprocessor output from among the plurality of door operator outputs, select at least one output function and corresponding program module from among the plurality of output functions, whereby the selected door operator output is triggered when the selected output function is performed.

5. The door operator of claim 4 wherein the microprocessor further includes multiple field programmable microprocessor inputs connected to multiple corresponding door operator inputs and input program modules corresponding to input functions and wherein the user interface allows interconnection between selected input functions and selected door operator inputs.

6. The door operator of claim 5 further including a plurality of input interface circuits connected between the microprocessor inputs and the door operator inputs.

7. A method of controlling a door operator having a door driver for performing a plurality of door functions on a door, the method comprising:
    providing a control system including a microprocessor having a plurality of field programmable microprocessor inputs, the microprocessor connected to and controlling the door driver, the microprocessor having a plurality of program modules corresponding to the plurality of door functions, the program modules being selectively mapped to the microprocessor inputs such that a selected one of the microprocessor inputs is mapped to a selected one of the program modules;

providing a plurality of door operator inputs connected to corresponding ones of the microprocessor inputs, each of the plurality of door operator inputs being connected to one of the microprocessor inputs by an input interface circuit such that an input device may be connected to one of the microprocessor inputs via an appropriate input interface circuit;

providing a user interface connected to the microprocessor for identifying to a controller a mapping of the selected one of plurality of the program modules to the selected one of the microprocessor inputs, the user interface configured to: select at least one door operator input and corresponding microprocessor input from among the plurality of door operator inputs, select at least one door function from among the plurality of door functions and corresponding program modules, whereby the selected door operator input is triggered when the selected input function is performed;

selecting at least one door operator input and corresponding microprocessor input;

selecting at least one function to be performed by the door operator; and associating the selected door operator input and corresponding microprocessor input with the program module corresponding to the selected function.

8. The method of claim 7 further including providing in the microprocessor multiple field programmable microprocessor outputs connected to multiple corresponding door operator outputs and output program modules corresponding to output functions and providing in the user interface allowance of interconnection between desired output functions and desired door operator outputs, and further including:

selecting at least one door operator output and corresponding microprocessor output;

selecting at least one output function to be performed by the door operator; and associating the selected door operator output and corresponding microprocessor output with the output program module corresponding to the selected output function.

9. The method of claim 8 further including providing a plurality of output interface circuits connected between the microprocessor outputs and the door operator outputs.

10. A method of controlling a door operator having a door driver for performing plurality of door functions on a door, the method comprising:

providing a control system including a microprocessor having a plurality of field programmable microprocessor outputs, the microprocessor connected to and controlling the door driver, the microprocessor having a plurality of program modules corresponding to the plurality of output functions, the program modules being selectively mapped to the microprocessor inputs such that a selected one of the microprocessor outputs is mapped to a selected one of the program modules;

providing a plurality of door operator outputs connected to corresponding ones of the microprocessor outputs, each of the plurality of door operator outputs being connected to one of the microprocessor outputs by an output interface circuit such that an output device may be connected to one of the microprocessor outputs via an appropriate output interface circuit;

providing a user interface connected to the microprocessor for identifying to a controller a mapping of the selected one of plurality of the program modules to the selected one of the microprocessor outputs, the user interface configured to: select at least one door operator output and corresponding microprocessor output from among the plurality of door operator outputs, select at least one output function from among the plurality of output functions and corresponding program modules, whereby the selected door operator output is triggered when the selected output function is performed;

selecting at least one door operator output and corresponding microprocessor output;

selecting at least one function to be performed by the door operator; and associating the selected door operator output and corresponding microprocessor output with the program module corresponding to the selected function.

11. The method of claim 10 further including providing in the microprocessor multiple field programmable microprocessor inputs connected to multiple corresponding door operator inputs and input program modules corresponding to input functions and providing in the user interface allowance of interconnection between desired input functions and desired door operator inputs, and further including:

selecting at least one door operator input and corresponding microprocessor input;

selecting at least one input function to be performed by the door operator; and associating the selected door operator input and corresponding microprocessor input with the input program module corresponding to the selected input function.

12. The method of claim 11 further including providing a plurality of input interface circuits connected between the microprocessor inputs and the door operator inputs.

* * * * *